Aug. 25, 1959 P. R. JONES 2,901,208
STABILIZED LOAD
Filed Jan. 11, 1957 3 Sheets-Sheet 1

INVENTOR.
PAUL R. JONES
BY Moody and Goldman
ATTORNEYS

INVENTOR.
PAUL R. JONES
BY Moody and Goldman
ATTORNEYS

Aug. 25, 1959 P. R. JONES 2,901,208
STABILIZED LOAD
Filed Jan. 11, 1957 3 Sheets-Sheet 3

INVENTOR.
PAUL R. JONES
BY Moody and Goldman
ATTORNEYS

United States Patent Office 2,901,208
Patented Aug. 25, 1959

2,901,208

STABILIZED LOAD

Paul R. Jones, Cedar Rapids, Iowa, assignor to Collins Radio Company, Cedar Rapids, Iowa, a corporation of Iowa Application January 11, 1957, Serial No. 633,731

10 Claims. (Cl. 248—346)

This invention relates to means for stabilizing a top-heavy mass.

Oftentimes, it is necessary to have a device that is stabilized on a moving vehicle, subject to pitch, roll, yawing and translation forces. Hence, various types of bearing or tracking antennas used on shipboard must be stabilized so that such forces do not substantially lower their tracking accuracy. For example, a radio-sextant antenna must be stabilized by an extraordinarily small amount to obtain a high degree of alignment accuracy with an astronomical body such as the sun. Furthermore, antennas of this type must be unobstructed radiation-wise in their upper hemisphere of alignment.

Ideally, such antennas should be mounted on a platform that maintains a fixed angular position with respect to the earth, regardless of angular variation of the vehicle upon which it is mounted.

Servo means are conventionally provided to obtain angular stability of platforms. A previously-known way of angularly stabilizing a mechanical load so that minimum servo-control forces were necessary was to mount the load on a platform supported on a set of gimbal axes. A difficulty with the gimbal type of mounting is that the center of gravity of the load must be positioned at the intersection of the gimbal axes. Since loads of the above-mentioned type are inherently top-heavy, large counter-balancing weights often had to be applied below the platform to lower the over-all center of gravity to the point of intersection of the gimbal axes. Accordingly, in the prior case, the height and weight of the system had to be increased to permit the counter-balancing load.

Since with such antennas the unbalanced center of gravity is relatively high above the platform, the counter-balancing load had to be several times the weight of the antenna where the space below the platform was limited. As a result, such prior antennas were often not completely counter-balanced, and servo-motors were occasionally burned out when servo forces became excessive, such as during extreme storm conditions on a ship.

The invention permits a top-heavy load to be stabilized without requiring any counter balancing weights to lower its center of gravity. The invention does not use gimbal axes.

The invention, therefore, provides a mounting arrangement for a stabilized load which can have smaller weight and lower height than prior-known means for stabilizing the same type of load.

The invention eliminates the transfer to its load of all torsional forces caused by linear and angular accelerations of the system, except those torsional forces transferred through the bearing friction in the system. Bearing friction can be made very small by using hydraulic bearings or, in some cases, by using roller or ball bearings. It has been found that where, at various times, very slow pitch and roll rates are involved, pressurized hydraulic bearings provide a minimum of friction at low angular rates.

The system of the invention permits several types of servo drive mechanisms, such as a rotary electric motor with gearing, hydraulic pistons, or torquers. When surrounded by a radome, the invention obtains a much smaller amount of translation of its load with respect to the radome, compared to prior gimbal-mounted platforms with the same type of load, and permits a smaller radome. Furthermore, when the system of the invention is not in use, it can be easily locked or stored in a fixed position, which is sometimes difficult with gimbal mounts.

With the invention, the height of the load above the platform is immaterial to the stability of the load; and, therefore, with the invention, the over-all center of gravity may be as high as necessary.

The invention includes an intermediate support between a load platform and a vehicle. The intermediate support contains two particular types (arrangements) of curved-bearing means, which are formed with special radii. The first type of bearing means slideably enables the intermediate support to support the platform and load. The second type of bearing means enables the vehicle to support the intermediate support, platform, and load. Each type of bearing means has a concave curvature on its load side and is captive in all directions except for arcuate movement. The center of curvature for the first type of bearing means is a point on a first axis passing through the first combined center of gravity of the load, the platform, and anything fixed with them. The center of curvature of the second type of bearing means is a point on a second axis passing through a second combined center of gravity, which is the combined center of gravity of the load, platform, intermediate support, and anything fixed with any of them. The first and second axes must be non-parallel.

In the general case, the first and second axes should be non-parallel. In the optimum case, both centers of gravity should lie on the yawing axis of the load, and the first and second axes should define separate planes with the yawing axis, wherein the planes are perpendicular to each other.

Accordingly, the second center of gravity is closer to the stabilized platform than the first center of gravity, because of the mass of the intermediate support and its position with respect to the center of gravity of the load.

Further objects, features and advantages of this invention will become apparent to a person skilled in the art upon further study of this specification and drawings, in which.

Now referring to the figures, M represents a load which must be stabilized angularly with respect to the earth, while being on a moving vehicle such as a ship. Load M may, for example, be the antenna system of a radiometric sextant, wherein the sextant requires that the antenna be aligned to an extremely high degree of accuracy with the line of radiation from an astronomical body such as the sun.

A platform 10 has load M fixed on its upper side. First and second platform supports 11 and 12 (best shown in Figure 4) are fixed below opposite sides of platform 10. Platform supports 11 and 12 are parallel to each other and are rounded along their bottom contour.

Figure 1:
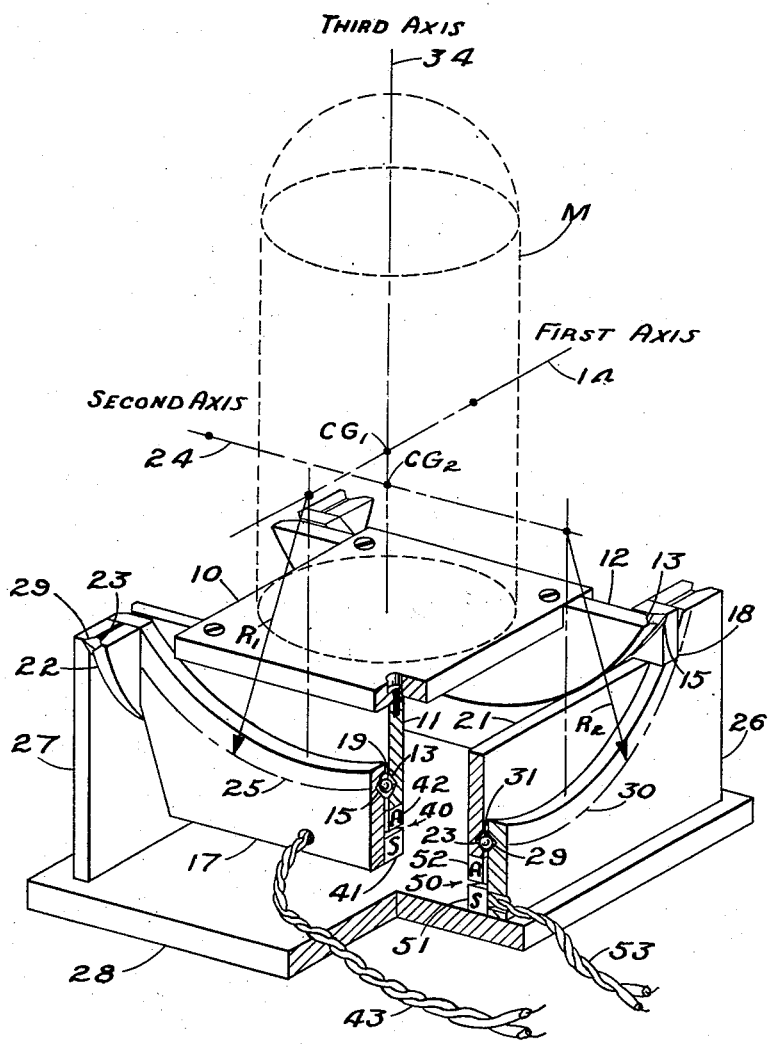
Figure 1 is a perspective view of one form of the invention.
Figure 3:
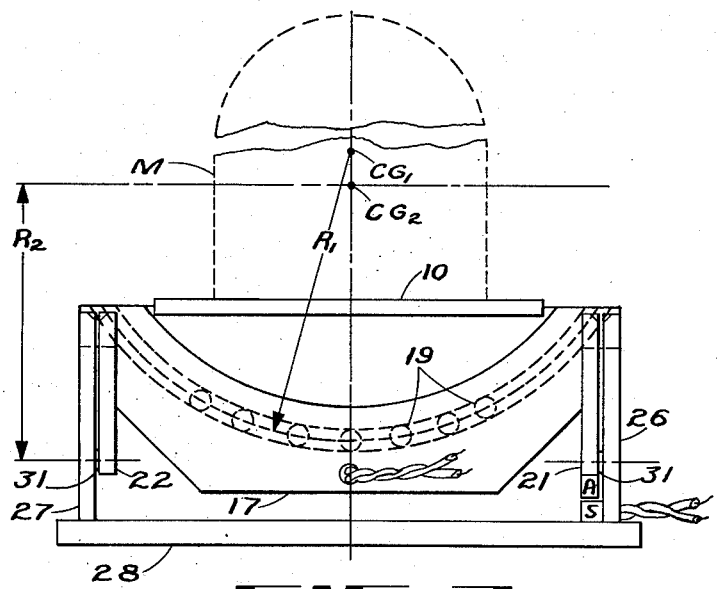
Figure 3 is another elevational view of the invention in Figure 1.

Each platform support is formed with a bearing race 13 on its outer side. However, bearing race 13 has its curved centerline defined by radius $R_1$ (as shown in Figure 3) which has its center-point on a first axis 14 (as shown in Figure 1) that passes through a first center of gravity $CG_1$. The first center of gravity $CG_1$ is the combined center of gravity of the connected mass including load M, platform 10 and platform supports 11 and 12, and anything attached to them, which are rigidly connected together as a unit and are supported by the first type of bearing means 25 (as shown in Figure 1), of which bearing races 13 are a part.

An intermediate-supporting means 16 (Figure 4) is comprised of four supporting members 17, 18, 21 and 22 transversely fixed together near their ends. The first and second members 17 and 18 are arranged parallel to each other and respectively adjacent to first and second platform supports 11 and 12. A bearing race 15 is formed on the inner side of each of the first and second intermediate members adjacent to the bearing races 13 in the respective platform support, as can be seen in Figure 1. A plurality of ball bearings 19 are received between adjacent bearing races 13 and 15 to provide the first type of bearing means, which enables intermediate supporting means 16 to support the platform and load.

Third and fourth members 21 and 22 are rigidly fixed to the first and second members 17 and 18 and are parallel to each other and substantially perpendicular to first and second intermediate members 17 and 18.

Figure 2:
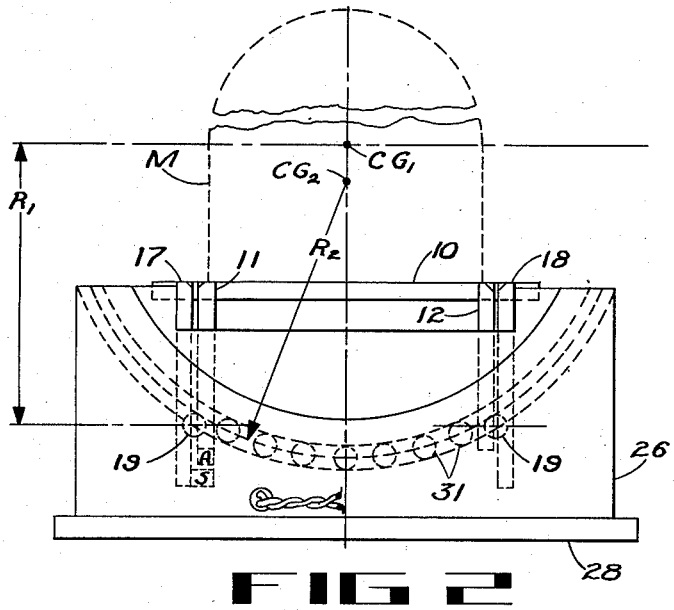
Figure 2 is an elevational view of one side of the invention, shown in Figure 1.

A bearing race 23 is formed on the outer side of each of third and fourth members 21 and 22. Each race 23 is a portion of a circle of arc having a radius $R_2$ (as shown in Figures 1 and 2) that has its center on a second axis 24 which passes through a second center of gravity $CG_2$. Center of gravity $CG_2$ is the center of gravity of the mass comprising load M, platform 10, platform supports 11 and 12, and intermediate-supporting means 16 and anything fixed to them. Therefore, the position of second center of gravity $CG_2$ differs from first center of gravity $CG_1$ primarily due to the mass and position of intermediate supporting means 16.

Figure 4:
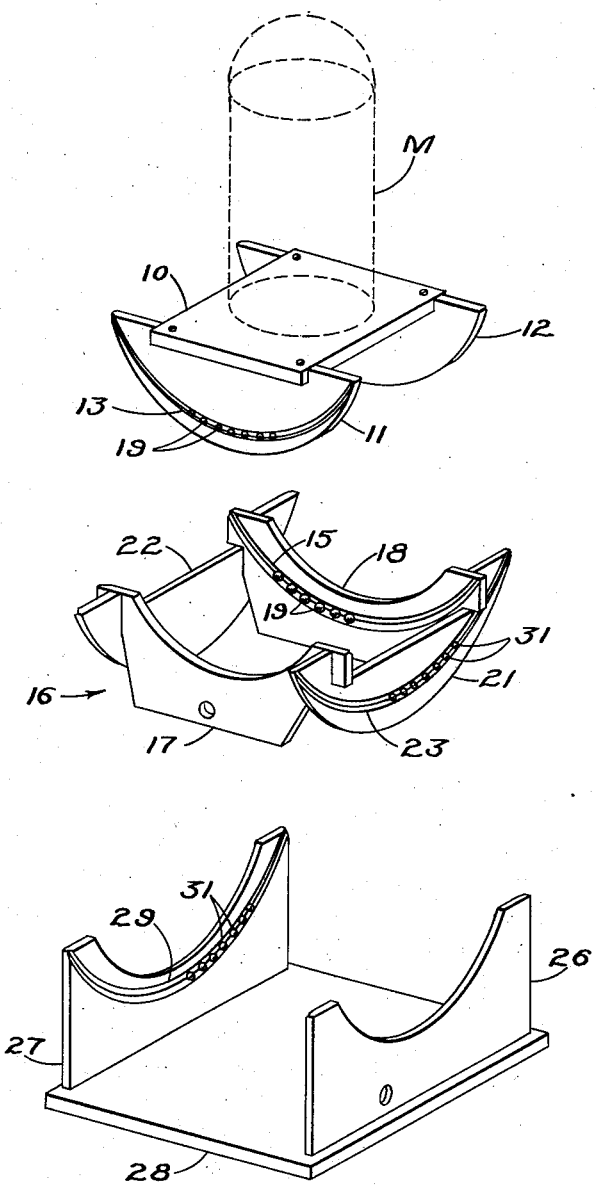
Figure 4 is an exploded view.

A pair of base members 26 and 27 (as shown in Figure 4) are received on opposite sides of third and fourth intermediate members 21 and 22, respectively, and are fixed in an upright position to a base 28 which may be fixed to a vehicle, such as a ship. Base members 26 and 27 each are formed on their inner side with a bearing race 29 adjacent to bearing race 23 in the intermediate member next to it. Ball bearings 31 are received between each pair of bearing races 23 and 29 to comprise the second type of bearing means 30 as shown in Figure 1.

If the vehicle represented by base 28 is a ship, it will have pitch and roll rotation components. On a ship, first axis 14 may be aligned axially with the ship, and second axis 24 may be aligned transversely with the ship. Then, first axis 14 is the roll axis, and second axis 24 is the pitch axis.

Often, it is required that the load be rotatable on its platform, as, for example, where azimuth rotation is required for a radiometric sextant antenna. This rotation is provided about a third axis 34 which is perpendicular to the plane of the platform 10. When platform 10 is stabilized about its pitch and roll axes, any yawing movement of the vehicle can be compensated by rotating the load about third axis 34 relative to the vehicle.

First and second centers of gravity $CG_1$ and $CG_2$ lie on third axis 34. Thus, when axis 34 is the yawing axis, yawing forces applied to base 28 are transmitted to the load through the yaw captivity of the bearings, unless the load is pivotable about yaw axis 34. With such pivoting and with $CG_1$ and $CG_2$ on yaw axis 34, a minimum of yaw forces are transferred to load M through the friction yaw axis of bearings (not shown).

If $CG_1$ and/or $CG_2$ do not lie on axis 34, as long as they lie on axes 14 and 24 respectively, no significant unstabilizing pitch and roll forces are caused, although an unbalanced yaw force exists.

A pair of servo motors 40 and 50 shown in Figure 1 are commonly called "torquers." Each of them comprises nothing more than the stator and rotor of an electrical motor, which has less than 360 degrees of arc. Their operation differs from that of an electric motor only in that the relative movement between the stator and rotor of a torquer is restricted to oscillatory type rotation within a fraction of a revolution of movement; while the armature and rotor of a motor are capable of maintaining continuous relative rotation.

A servo control force about first axis 14 is provided in Figure 1 by torquer 40, which has its stator 41 fixed to first intermediate member 17 and its rotor 42 fixed adjacently to first platform support 11. A flexible lead 43 connects the servo feedback loop (not shown) to the electrical windings of stator 41. Rotor 42 is assumed in Figure 1 to be a passive element such as a permanent magnet or an induction winding; where the torquer operates as a direct current motor, synchronous motor, or an induction motor, respectively. The servo systems (not shown) controlling torquers 40 and 50 utilize a sensing means (not shown) located with load M. Such sensing means may, for example, be a pendulum or a gyroscopic device. Such types of servo systems are well-known in the art and are not explained in detail herein. Accordingly, the servo system of torquer 40 positions load M and stabilizes it about first axis 14 due to the unstabilizing frictional force of bearings 19.

Second torquer 50 controls the movement of the load about second axis 24. Second torquer 50 comprises a stator 51 fixed to first base member 26 in Figure 1 and a rotor 52 fixed with third intermediate member 21 adjacent to stator 51. Second torquer 50, like first torquer 40, is assumed in Figure 1 to be of the type wherein only its stator requires an electrical input, which is provided through a lead 53, connected to a second servo feedback loop (not shown). Second torquer 50 similarly utilizes another sensing means (not shown) included with load M to sense any rotation of load M about second axis 24. Hence, the servo system of torquer 50 positions load M and stabilizes it about axis 24 due to the unstabilizing frictional force of bearings 31.

The servo system can position load M to any given angular position within its limits of movement. Thereafter, the servo system need only provide small amounts of correcting force to compensate for deviation from this position by frictional forces transmitted to the bearings as the base pitches and rolls.

If it is assumed that bearings 19 and 31 do not transmit any frictional forces, the invention can maintain load M at the same angular relationship to the earth, without the use of a servo system. However, it is impossible at this time to design bearings which do not transmit any frictional forces, particularly where the load is heavy. It, for example, might weigh hundreds or thousands of pounds.

Accordingly, the only forces unstabilizing the angular position of load M, which must be compensated by a servo system, are bearing-frictional forces. With proper bearing design, these frictional forces can be kept small, and therefore the servo output torques involved can be kept small. Consequently, the invention permits exceptionally small servo output torques to compensate the effects of very large amounts of pitch and roll upon a heavy load.

The servo torque can be provided in a number of ways other than by "torquers" in the invention. For example, it may be provided from rotary electric motors through gears or through hydraulic means. But the system shown in Figure 1 provides a servo torque connection which does not add to the frictional forces between the relatively moving portions of the invention.

The reason why pitching and rolling motions of base 28, or why any combination of pitching and rolling motions of base 28, is not transmitted to load M is due to the fact that a force applied to either the first or second bearing means or both can only have force components normal to the bearing contour (neglecting frictional forces); and these force components all pass through their respective axis 14 or 24 which contains the respective center of gravity for the mass operated on by the respective forces. Thus, the projection of these transmitted forces through their respective center of gravity prevents them from causing any turning moment about either center of gravity. Consequently, when base 28 is subjected to pitching and rolling forces or a combination of them, no turning moment is transmitted to the load, except through the bearing friction, which can be kept very small.

Furthermore, accelerating translations of the entire system, as occur on shipboard, do not cause any rotation of load M. All accelerating forces acting on load M, regardless of direction, are transferred to base 28 by virtue of their resolution into force components normal and parallel to the two axes of rotation 14 and 24. Any force component in the direction of yawing axis 34 passing through the centers of gravity obviously does not cause any rotation of mass M. This leaves for consideration only the acceleration in the directions of axes 14 and 24.

Acceleration of the entire system in the direction of axis 24 is first considered. This acceleration causes a force on every portion of the system in the direction of axis 24. However, in this direction, intermediate support 16 is rigid with base 28, because bearing means 30 is captive in this direction. Therefore, the only mass remaining is above the captivated intermediate support 16. This remaining mass has a center of gravity $CG_1$, which was defined above. Consequently, the acceleration of the mass having $CG_1$ causes a resultant accelerating force at $CG_1$ parallel to axis 24. This force must be transmitted through bearing means 25, which nevertheless is only capable of transmitting static forces normal to its contour. However, the acceleration force at $CG_1$ resolves itself into components that pass normally through bearing means 25 to base 28. This is because the position of the force at $CG_1$ is on a line passing through the centers of arc for bearing means 25. These normal forces pass through the axis of rotation including $CG_1$ and, therefore, do not cause any turning moment of load M. As explained above, a bearing means is static when forces are only being applied normal to it. Accordingly, mass M is stable for acceleration in the direction of axis 24.

On the other hand when the system is accelerated in the direction of axis 14, acceleration forces again act upon the entire system but in that direction. However, in direction 14, load M and its platform attachments are rigid with intermediate support 16 and are an accelerating unit which combine to have center of gravity $CG_2$. Therefore, they have a resultant acceleration force that acts at $CG_2$ in the direction of first axis 14. This force must be transmitted through bearing means 30 to base 28. However, all components of this force pass normally through bearing means 30, since this force is located at $CG_2$ which is on a line (axis 24) passing through the centers of arc of bearing means 30. Accordingly, this force resolves itself into components that pass normally through bearing means 30 and intersect at axis 24 to prevent any turning moment, when $CG_2$ lies on axis 24. Consequently, the system is stable with respect to accelerating forces in the direction of first axis 14.

It is realized that accelerating forces intermediate directions 14 and 24 can be resolved into components in both directions, which can be analyzed in the same manner. Thus, a system is provided that is stable with respect to accelerating forces in any direction, wherein pitch, roll, yawing and acceleration forces do not cause rotation of load M, except for forces transmitted through bearing friction, which can be kept very small.

When external forces are applied to load M, they can cause a change in the angular position of the load, if they are not applied through the respective centers of gravity. For example, a wind force applied in the direction of first axis 14 may cause a turning force unless its center of force aligns with $CG_2$. A means for eliminating the effects of wind force is to provide a radome about the entire unit.

It is seen that as base 28 pitches, rolls, yaws and accelerates, load M does not change its angular position, although it translates its position with base 28. The centers of gravity $CG_1$ and $CG_2$ move a minimum amount with respect to translation, pitch, and roll of the base, compared to other parts of load M.

Generally, tall loads provide high centers of gravity. As the centers of gravity $CG_1$ and $CG_2$ are increased in height above platform 10, the radii of curvature $R_1$ and $R_2$ of the bearing means is increased. Often, it is required to position the platform as low as possible with respect to base 28. In the invention, as the centers of gravity are increased in height, the increase in radii of the bearing means permits a larger platform with relatively small depth for intermediate supporting means 16. Accordingly, the invention permits an increase in the size of the platform to compensate for handling of tall loads, without necessarily causing a corresponding increase in the height of the platform.

Although this invention has been described with respect to a particular embodiment thereof, it is not to be so limited as changes and modifications may be made therein which are within the full intended scope of the invention as defined by the appended claims.

I claim:

1. Means for stabilizing a load to minimize its rotation with respect to a movable base means, comprising intermediate-supporting means between said load and said base, first-bearing means connected between said load and said intermediate-supporting means to support the mass of said load on said supporting means, with said first-mentioned mass having a first center of gravity, second bearing means connected between said base and said intermediate-supporting means to support the mass of said load and said supporting means on said base, with said second-mentioned mass having a second center of gravity, a pair of nonparallel axes passing respectively through each of said centers of gravity, said first bearing means being aligned arcuately about said first axis, and said second bearing means being aligned arcuately about said second axis.

2. Means for stabilizing a load on an unstable supporting base, comprising intermediate-supporting means between said base and load, with said intermediate-supporting means supporting said load, and said base supporting both said load and said intermediate-supporting means, first-bearing means being coupled between said intermediate-supporting means and said load to support the mass of said load, the load having a first center of gravity, a first axis passing through said first center of gravity, second-bearing means coupled between said base and said intermediate-supporting means to support the combined mass of said intermediate-supporting means and said load, with said combined mass having a second center of gravity, a second axis passing through said second center of gravity, said first and second axes lying in respective planes that are substantially perpendicular to each other and to the normal position of said base, said first-bearing means aligned about said first axis, and said second bearing means aligned about said second axis.

3. Means for rotationally stabilizing a load with respect to the pitching, rolling, and translational accelerations of a base, comprising an intermediate-supporting means supported by said base, and said load supported on said intermediate-supporting means, a first-bearing means coupling said load to said intermediate-supporting means, the entire mass supported by said first-bearing means having a first center of gravity, said first-bearing means having a curved form and having a center of curvature lying on an axis passing through said first center of gravity, second-bearing means coupled between said intermediate-supporting means and said base to support said intermediate-supporting means and its load, the entire mass supported by said second-bearing means having a second center of gravity, said second-bearing means having a curved form an having a center of curvature lying on a second axis passing through said second center of gravity, and said axes respectively lying in planes perpendicular to each other.

4. Means for stabilizing a load supported on an unstable base, comprising an intermediate support located on said base, and said load being supported on said intermediate support, a first pair of bearings connected between said load and opposite sides of said intermediate support, the mass supported by said first pair of bearings having a first center of gravity, a first-defining axis passing through said first center of gravity, each of said first pair of bearings being curved in form and having a center of curvature lying substantially on said first-defining axis, a second pair of bearings connected between other opposite sides of said intermediate support and said base to support said load and intermediate support on said base, the entire mass supported by said second pair of bearings having a second center of gravity, a second-defining axis passing through said second center of gravity, said second pair of bearings being curved in form and having a center of curvature lying substantially on said second-defining axis, each of said bearings being restricted in relative movement along its curvature.

5. A stabilization system as defined in claim 4 in which said centers of gravity lie in the same vertical line.

6. A stabilization system as defined in claim 4, in which a third axis of rotation is provided for said load relative to said intermediate support, said third axis being substantially perpendicular to said first and second axes, and said first and second centers of gravity being substantially on said third axis.

7. Means for stabilizing a load relative to a base member, comprising a platform supporting said load, an intermediate support fixed to said platform and load to support them, first bearing means connected between said intermediate support and said platform to support the mass of said platform and load, second bearing means connected between said intermediate support and said base member to support the mass of said load and platform and intermediate support, a first center of gravity being defined by said first-mentioned mass, a second center of gravity being defined by said second-mentioned mass, each of said bearing means having a curved form for arcuate movement, said first bearing means having a center of curvature lying substantially on a first-defining axis passing through said first center of gravity, said second bearing means having a center of curvature lying substantially on a second-defining axis passing through said second center of gravity, and said two axes lying in substantially transverse planes which intersect in an upright line.

8. Means for enabling stabilization of a load relative to a movable base, comprising a platform supporting said load, first and second platform supports fastened near opposite sides of said platform, an intermediate support including four members connected near their ends, with the first and second members being substantially parallel to each other, and the third and fourth members being substantially parallel to each other and perpendicular to the first and second members, a first pair of curved-bearings coupled between said first and second platform supports respectively and said first and second members, the entire mass supported by said first pair of bearings being that of said platform and its first and second supports and said load, with them having a first combined center of gravity, a first-defining axis passing through said first combined center of gravity, the center of curvature of each of said first pair of bearings lying substantially on said first axis on opposite sides of said first center of gravity, first and second base members fixed to said base, a second pair of curved-bearings respectively coupled between said third and fourth intermediate members and said first and second base members, the entire mass supported by said second pair of bearings being that of said intermediate support and said platform and its supports and said load, with them having a second combined center of gravity, a second-defining axis passing through said second center of gravity, and the centers of curvature of said second pair of bearings lying substantially on said second axis on opposite sides from said second combined center of gravity.

9. A stabilized system as defined in claim 8 having a vertical axis, said vertical axis being substantially perpendicular to said first and second axes.

10. A stabilized system as defined in claim 9 having said first and second combined centers of gravity lying substantially on said vertical axis.

References Cited in the file of this patent

UNITED STATES PATENTS

| | | |
|---|---|---|
| 1,215,233 | Alford | Feb. 6, 1917 |
| 2,475,499 | Hearst | July 5, 1949 |
| 2,715,007 | Zeitlin | Aug. 9, 1955 |